Figure 1:
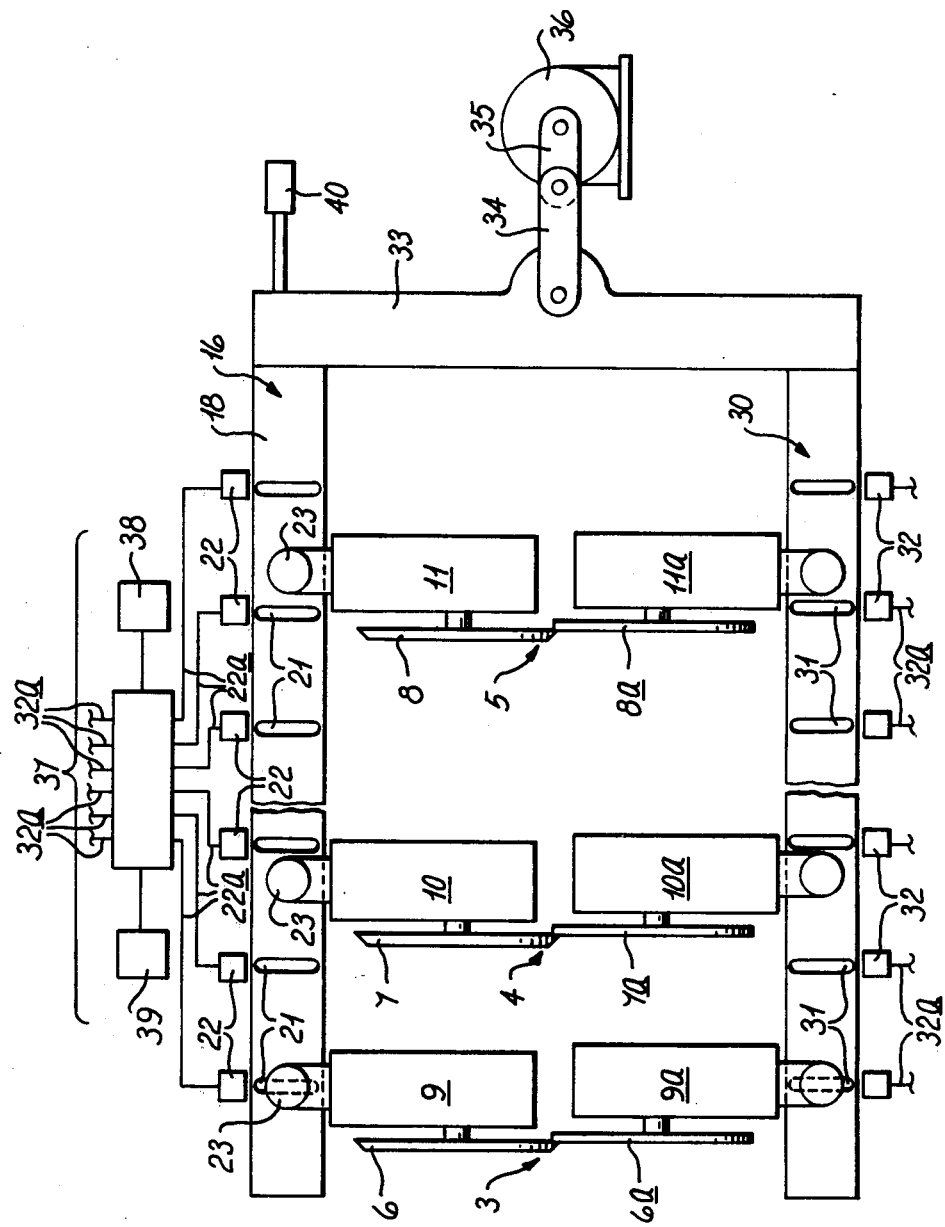

United States Patent [19]
Jones et al.

[11] 4,188,846
[45] Feb. 19, 1980

[54] POSITIONING APPARATUS

[75] Inventors: Graham R. S. Jones; Edwin E. Wyatt, both of Bristol, England

[73] Assignee: Masson Scott Thrissell Engineering Limited, Bristol, England

[21] Appl. No.: 929,047

[22] Filed: Jul. 28, 1978

[30] Foreign Application Priority Data

Aug. 11, 1977 [GB] United Kingdom ............... 33637/77

[51] Int. Cl.² .............................................. B23D 19/06
[52] U.S. Cl. ........................................ 83/499; 83/504
[58] Field of Search ............. 83/499, 498, 504, 425.2, 83/425.4

[56] References Cited
U.S. PATENT DOCUMENTS 3,954,050  5/1976  Grobman ........................... 83/504 X Primary Examiner—J. M. Meister
Attorney, Agent, or Firm—Seidel, Gonda, Goldhammer & Panitch

[57] ABSTRACT

Slitter knives on a paper winder are moved to new positions by a bar to which the knife supports are coupled by means of a pin, carried on each support, and which engages in one of a number of holes equi-spaced along the bar. The bar is reciprocated so that the supports may be moved, in either direction, by successive increments equal to the hole pitch. The supports are moved in this manner until they each reach the nearest and most expedient hole to the new position. The bar is then moved one more pitch and as each support is determined to be at its new position its pin is withdrawn from the hole and it is clamped to stationary rails.

Mounted on the bar opposite each hole is a switch arranged for operation by the pin, and connected to a central micro-processor which continuously monitors and controls movement of the knife supports.

7 Claims, 7 Drawing Figures

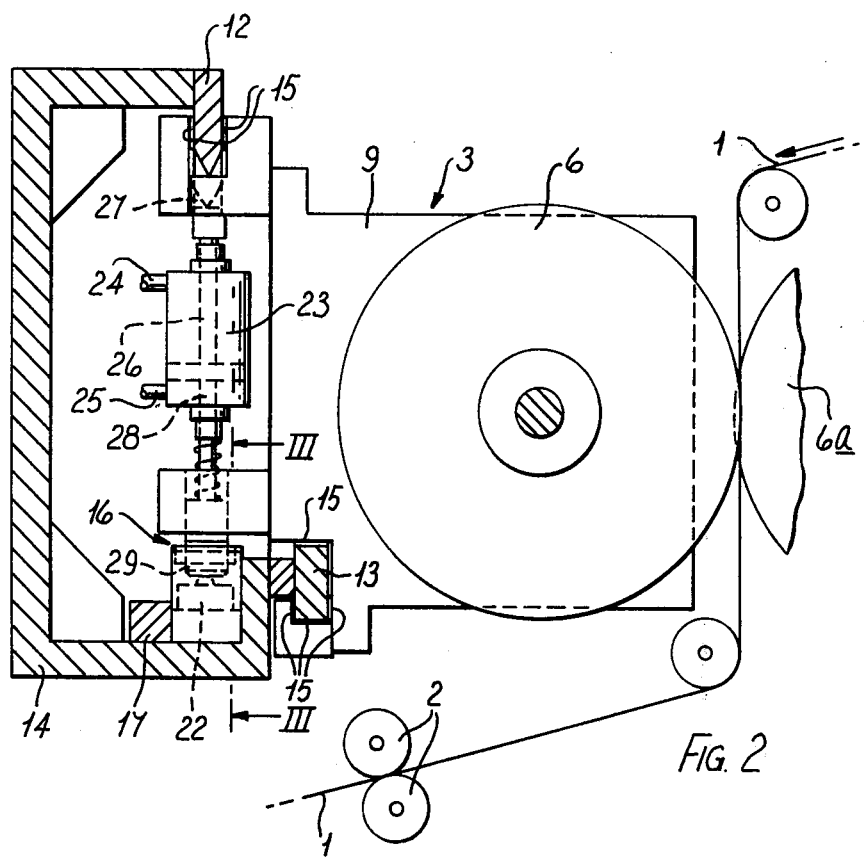
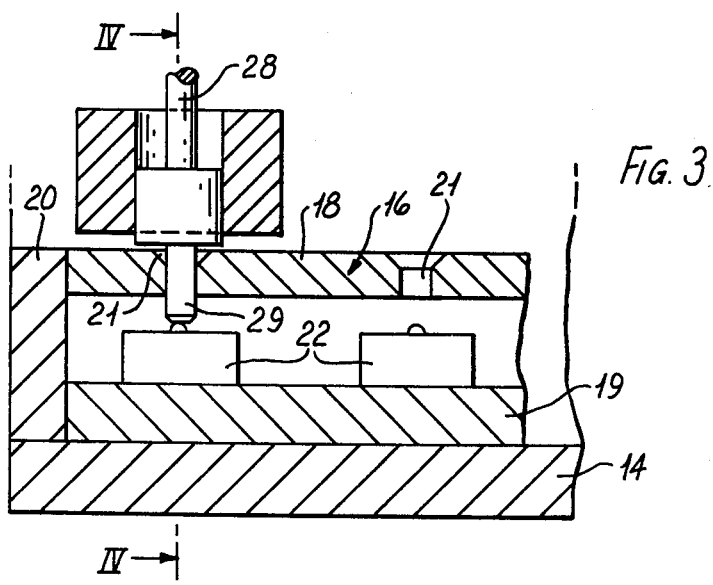

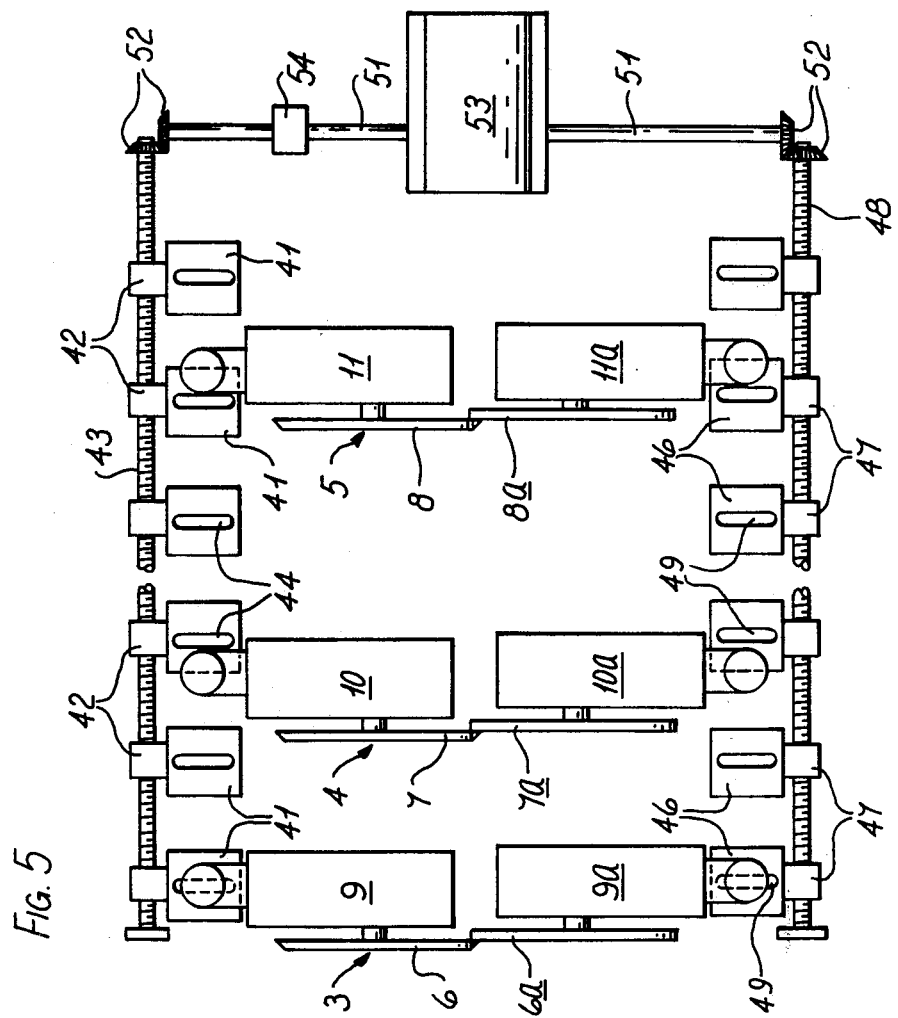
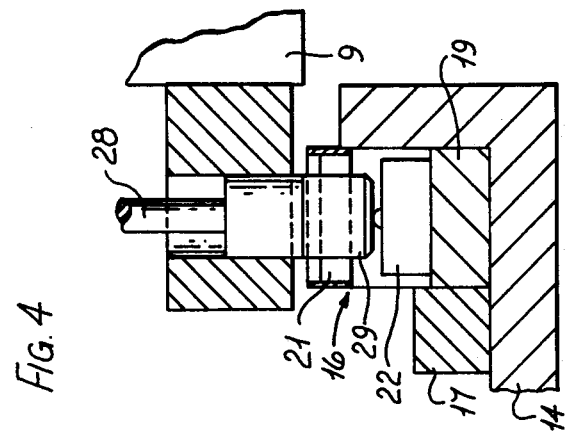
Fig. 5
Fig. 4

POSITIONING APPARATUS

This invention concerns improvements in or relating to apparatus for positioning a movable member at a selected position on a support.

One example of such apparatus is that for longitudinally slitting webs of paper, cardboard, corrugated board or the like into two or more narrower webs.

Slitting apparatus of this type usually comprises of one or more pairs of rotary cutters, with their peripheries in overlapping engagement, supported on opposite sides of the web, the position of the cutters being adjustable across the path of the web so that the width of the narrower webs produced may be selected as required.

In relation to such slitters it is known to move the cutters by means of threaded rods, which extend across the width of the machine, when the rods are rotated, or by means of hydraulic or pneumatic rams attached to a block on which the cutter is mounted. It is further known to provide a guide along which the cutters are movable by means of a reciprocable transfer bar, the cutters being clamped to the transfer bar whilst being moved and clamped to the guide when it has reached the desired position. In these cases however stops are provided which are presettable to the desired positions across the machine prior to the cutters being moved, which is a manual operation and is time consuming.

According to the present invention there is provided apparatus for positioning a movable member at a selected position on a support, comprising support means on which said movable member is movably mounted, a driver member for propelling said movable member along said support means to a selected position, said movable member being provided with a first coupling means, said driver member being provided with a plurality of second coupling means equi-spaced therealong, operating means for selectively moving said first coupling means into and out of engagement with any one of said second coupling means to provide a drive connection between said movable member and said driver member, securing means for releasably securing said movable member to said support means, means for actuating said securing means, and a control means, including means for sensing the establishment of said driving connection by engagement of said first coupling means with one of said second coupling means, said control means being connected to said sensing means for monitoring and controlling said movable member.

In a preferred form the driver member may comprise a continuous beam, said second coupling means being equi-spaced therealong, drive means being provided to reciprocate said beam repeatedly.

In a further form said driver member may be a composite member comprising a common propelling member and a plurality of separate elements each provided with a second coupling means, said separate elements being so positioned along the common propelling member that said second coupling means are equi-spaced therealong. Conveniently said propelling member may comprise a lead screw, fixed against axial movement, wherein each of said separate elements includes a nut which engages said lead screw, and means to rotate said lead screw in either direction so as to move said separate elements towards said selected position.

Preferably said sensing means comprises a switch associated with each of said second coupling means, said first coupling means then comprises a pin and each of said second coupling means comprises a hole formed in said driver member, wherein said pin is inserted into one of said holes by said operating means to establish said drive connection, and is adapted to engage and operate the associated switch as said drive connection is established.

Figure 6:
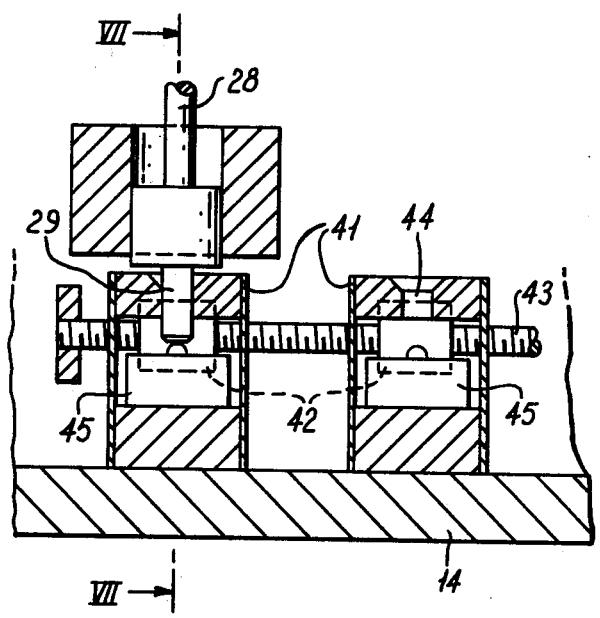
Figure 7:
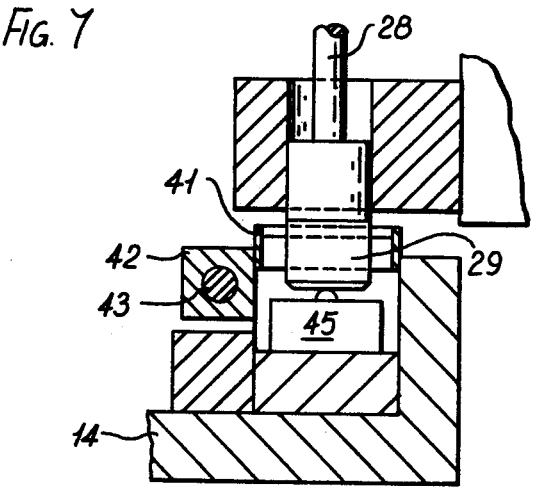

The invention will now be described by way of example only, with reference to the accompanying drawings in which:

FIG. 1 is a schematic view of apparatus, embodying the invention, for longitudinally slitting a web of paper, FIG. 2 is a side view, partly in section; of a slitter unit for use in the apparatus of FIG. 1, FIG. 3 is a section taken on the line III—III of FIG. 2, and drawn to a larger scale, FIG. 4 is a section taken on the line IV—IV of FIG. 3, FIG. 5 is a schematic view of a modified form of apparatus to that shown in FIG. 1, FIG. 6 is a sectional view of part of the apparatus of FIG. 5, and FIG. 7 is a section taken on the line VII—VII of FIG. 6.

Referring first to FIGS. 1, 2, 3 and 4, a continuous web 1 of paper is fed in the direction shown by the arrow by a pair of co-operating feed rollers 2 (FIG. 2). Three slitter units 3, 4 and 5 are spaced apart across the web 1 at selected positions and respectively carry pairs of rotary cutters 6, 6a; 7, 7a and 8, 8a, the cutters of each pair co-operating to slit web 1, in known manner, as it is fed therebetween to produce four narrower webs. The positions of the slitter units 3, 4 and 5 across the web 1 may be changed so as to slit the web into different widths of narrower webs as will now be described.

The cutters 6, 7 and 8 are rotatably mounted respectively on support means formed by carriers 9, 10 and 11, and cutters 6a, 7a and 8a are similarly mounted on carriers 9a, 10a and 11a respectively. The carriers 9, 10 and 11 are supported by support rails 12, 13 which extend across the width of the machine and are attached to a girder 14 carried on a fixed part of the machine, the carriers 9, 10 and 11 each being provided with pads 15 of low friction material where there is contact with the rails 12, 13 to facilitate movement of the carriers therealong.

The carriers 9, 10 and 11 are moved along the rails 12, 13 in either direction by conveying means in the form of a beam 16 which extends across the machine and is arranged to slide on the girder 14, and is held in place by a block 17. The beam 16 comprises a top plate 18, a base plate 19 and two end plates 20 only one of which is shown in the drawings, the top plate 18 being provided with a number of slots 21 which are accurately equi-spaced apart along the length of the beam. Fixed to the base plate 19 directly below each of the slots 21 is a micro-switch 22.

Fixed to each of the carriers 9, 10 and 11 is a double acting cylinder 23 having two connections 24, 25 which may be selectively connected to a source of pneumatic or hydraulic pressure. A piston rod associated with cylinder 23 has at its upper end 26 a clamping block 27 which is arranged to engage the bottom face of the rail 12 whenever pressure is applied to cylinder 23 via connection 25 so as to secure the associated carrier in any selected position along the rails 12, 13. The other end 28 of the piston rod has a slide 29 fixed to it which is arranged to pass through one of the slots 21 in the top plate 18 of beam 16 whenever pressure is applied to cylinder 23 via connection 24 so as to couple the carriers 9, 10 and 11 to the beam 16 when it is desired to move the carriers to different positions along the rails 12, 13. Engagement of a slide 29 in a slot 21 is detected by the associated switch 22.

Whilst the carriers 9, 10 and 11, and thus also the cutters 6, 7 and 8, are being moved to different selected positions it is desirable that the respective relative position of each of the cutters 6a, 7a and 8a is maintained. In order to ensure this, the carriers 9a, 10a and 11a are mounted for movement along, and may be clamped to, rails (not shown), in a similar manner to the carriers 9, 10 and 11, the carriers 9a, 10a and 11a being movable along the rails by means of a beam 30 (FIG. 1) provided with slots 31 which may be engaged by slides (not shown) in the same way as the slots 21 are engaged by slides 29, micro-switches 32 being provided adjacent each slot 31 to detect the presence, or absence, of a slide. The beams 16 and 30 are each attached to a cross link 33 so that the slots 21 and 31 are in alignment. The link 33 is connected by a lever 34 to the free end of a crank arm 35 which is rotated by a motor 36 thus causing both the beams 16, 30 to be reciprocated in unison over a distance at least equal to the pitch of the slots 21, 31.

The sequence of operations for moving the slitter units 3, 4 and 5 from the positions shown in FIG. 1 to different selected positions will now be described. To enable these operations to be carried out automatically in the correct sequence a control unit 37 is provided having a data store 38 and displacement determining device 39. The control unit 37 may take various forms but preferably it is an electronic computer of the type commonly known as a "micro-processor".

In the position shown in FIG. 1 the beams 16 and 30 are at rest, in a datum position at one end of their stroke with carriers 9, 10 and 11 clamped to the rail 12 and carriers 9a, 10a, and 11a clamped in similar manner to an associated rail. The position of each of the switches 22, 32 with the beams 16, 30 in he datum position, is known to the control unit 37 and is held in the data store 38, the switches 22, 32 being linked to the control unit 37 respectively by electrical connection 22a, 32a. The movement of the beams 16, 30 is measured by a digital position encoder 40 of any known suitable type, e.g. it is arranged to produce pulses, a number of which correspond to a certain movement of the beams, and accumulates the number of pulses produced in a counter or like device, which enables the control unit 37 to determine any position between successive slots 21, 31. The encoder 40 therefore needs to cover a distance equal to the stroke of the beams 16, 30.

Only the repositioning of carriers 9, 10, and 11 will be described, it being understood that the carriers 9a, 10a, and 11a will however, be simultaneously repositioned in the same manner.

Data indicative of the positions that the slitter units 3, 4 and 5 are to be moved to is fed into the control unit 37. The beam 16 is reciprocated slowly through one complete cycle of movement by operation of motor 36, connections 25 are vented and pressure applied to connections 24 so that the clamping blocks 27 disengage from the rail 12 and the slides 29 contact the top plate 18. As a slot 21 passes beneath a slide 29 the latter moves downwardly through that slot to couple the associated carrier to the beam 16, and operates the associated switch 22. When all the carriers 9, 10 and 11 have been so coupled to the beam 16, which will have occurred by the time the beam comes to rest again at the end of the stroke, it is possible for the control unit 37 to interrogate the switches 22 and identify the locations of the carriers 9, 10 and 11 with reference to the sequence of slots in the beam 16. This interrogation also serves as a check that all the carriers have been coupled to the beam. It should be noted that all the carriers 9, 10, 11 will have been coupled to the beam 16 at the end of a half cycle of movement so that, if desired, the switches 22 may be interrogated by control unit 37 at this time.

The speed of the motor 36 is now increased and the beam 16 is repeatedly reciprocated so that the carriers 9, 10 and 11 are moved incrementally, in either direction, one slot pitch at a time by alternately disengaging the slides 29 from, and engaging them in, successive slots 21 until they reach the respective slot 21, defining a coarse position location which is nearest and most convenient to the appropriate new selected position. It will be appreciated that a slide 29 is engaged in a slot 21 while the beam is moving in the desired direction and is disengaged therefrom while it is moving in the opposite direction. The allocation of one of the carriers 9, 10 and 11 to each of the selected positions is predetermined as is the determining of the most convenient slot 21. When each carrier 9, 10 and 11 has been coupled to the beam 16, through its respective slot 21 which is most convenient to its new selected position, which is indicated to the control unit 37 by operation of the correct switches 22, and the beam 16 is at the datum position, the speed of the motor is decreased and during the next half cycle of movement of the beam 16 final positioning of the carriers 9, 10 and 11 is achieved by uncoupling each carrier from the beam 16 and clamping it to the support rail 12 as it reaches its respective selected position. Since the beam 16 is at the datum position at the start of the final positioning stroke and the positions of the slots 21 are known, then each of the carriers 9, 10 and 11 is at a different datum position at this time. As the beam 16 is moved by the motor 36 the encoder 40 is interrogated by the control unit 37, and the device 39 responds when each of the carriers 9, 10 and 11 reaches its respective selected position, which occurs by sensing when the pulse count of encoder 40 corresponds to the respective distances to be moved by each of the carriers 9, 10 and 11 from their respective datum positions to their selected positions, and causes the associated cylinder 23 to be operated so that the slide 29 is withdrawn from the slot 21, and block 27 engages the rail 12 to clamp the carrier in the selected position along the rail 12.

In a modified form of apparatus for moving the slitter units 3, 4 and 5 along the rails 12, 13, as illustrated in FIGS. 5, 6 and 7, the beam 16 is replaced by a number of separate members 41 which are each fixed to a separate block 42. The latter are formed as nuts threaded onto a lead screw 43 which extends across the width of the machine and is fixed against axial movement. Each member 41 is provided with a slot 44 and an associated switch 45, corresponding to slots 21 and switches 22. The beam 30 is similarly replaced by separate members 46, blocks 47 and lead screw 48. Each member 46 is provided with a slot 49 and an associated switch 50, corresponding respectively to the slots 31 and switches 32, the switches 45, 50 being linked to the control unit 37. The lead screws 43, 48 are coupled by a shaft 51 and bevel gears 52 and are driven in unison in either direction by a motor 53. The linear positional encoder 40 is replaced by a rotary encoder 54 mounted on the shaft 51. The blocks 42, 47 are so positioned along their respective lead-screws 43, 48 that the slots 44, 49 are equi-spaced therealong and each slot 44 is in alignment with a different slot 49.

The operation of the apparatus of FIGS. 5, 6 and 7 in moving the slitter units to selected positions along the rails 12, 13 is such that the reciprocation of the members 41, 46 is obtained by rotating the lead screws 43, 48 first in one direction and then the other through a sufficient angle as to cause the stroke of reciprocation to be equal to the pitch of the slots 44, 49. The automatic supervisory control of the repositioning operation by the control unit 37, switches 45, 50 encoder 54 and cylinders 23 is the same as that described with reference to FIGS. 1 to 4.

In the foregoing, and after the coarse repositioning sequence described above, the slitter units are all moved in the same direction to their respective selected positions, which accounts for the fact that the most convenient slot to each selected position, is not always the nearest. However, it may be desirable to move the slitter units to their respective selected positions in either direction, in which case the most convenient slot to that position would be nearest.

It may happen that the number of slits to be made in the web is less than the number of slitter units available. In this situation the slitter units most conveniently positioned relative to the new positions are moved to those positions and the other slitter units are moved to other selected positions, but the cutters of these other slitter units are not brought into overlapping relationship so that the web on passing between them is not slit.

We claim:

1. Apparatus for positioning a movable member at a selected position on a support, comprising support means on which said movable member is movably mounted, a driver member propelling said movable member along said support means to a selected position, said movable member being provided with a first coupling means, said driver member being provided with a plurality of second coupling means equi-spaced therealong, operating means for selectively moving said first coupling means into and out of engagement with any one of said second coupling means to provide a drive connection between said movable member and said driver member, securing means for releasably securing said movable member to said support means, means for actuating said securing means, and a control means, including means for sensing the establishment of said driving connection by engagement of said first coupling means with one of said second coupling means, said control means being connected to said sensing means for monitoring and controlling said movable member.

2. Apparatus as claimed in claim 1 in which said driver member comprises a continuous beam, said second coupling means being equi-spaced therealong, drive means being provided to reciprocate said beam repeatedly.

3. Apparatus as claimed in claim 1 in which said driver member is a composite member comprising a common propelling member and a plurality of separate elements each provided with a second coupling means, said separate elements being so positioned along the common propelling member that said second coupling means are equi-spaced therealong.

4. Apparatus as claimed in claim 3 in which said propelling member comprises a lead screw, fixed against axial movement, wherein each of said separate elements includes a nut which engages said lead screw, and means to rotate said lead screw in either direction so as to move said separate elements towards said selected position.

5. Apparatus as claimed in claim 1 in which said sensing means comprises a switch associated with each of said second coupling means.

6. Apparatus as claimed in claim 5 in which said first coupling means comprises a pin and each of said second coupling means comprises a hole formed in said driver member, wherein said pin is inserted into one of said holes by said operating means to establish said drive connection, and is adapted to engage and operate the associated switch as said drive connection is established.

7. Apparatus for slitting a web of paper, or like material, lengthwise to form a number of narrower webs, including positioning apparatus as claimed in claim 1 in which said movable member comprises a carrier on which at least one cutter knife is carried, said carrier being movable by said positioning apparatus so as to position said cutter knife at a selected position across said web.

* * * * *